(12) United States Patent
Clarke et al.

(10) Patent No.: US 6,452,395 B1
(45) Date of Patent: *Sep. 17, 2002

(54) ENHANCED DETECTION METHOD

(75) Inventors: Richard Hedley Clarke; John William Aidan Millar, both of Wiltshire (GB)

(73) Assignee: Court Services Limited, Isle of Man (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/492,546

(22) Filed: Jan. 27, 2000

Related U.S. Application Data

(63) Continuation of application No. PCT/GB98/02234, filed on Jul. 27, 1998.

(30) Foreign Application Priority Data

Jul. 28, 1997 (GB) ............................................. 9715912

(51) Int. Cl.⁷ .......................... G01V 11/00; G01V 1/40; G01V 3/18
(52) U.S. Cl. .................... 324/323; 324/351; 73/152.05; 367/25
(58) Field of Search ................................. 324/351, 323, 324/344, 347, 334, 348; 181/102; 367/25; 73/152.01, 152.02, 152.05

(56) References Cited

U.S. PATENT DOCUMENTS

| | | | | |
|---|---|---|---|---|
| 4,699,352 A | * | 10/1987 | Mumby | 251/30.03 |
| 5,229,553 A | * | 7/1993 | Lester et al. | 181/102 |
| 5,519,322 A | | 5/1996 | Pozzi et al. | |
| 5,903,153 A | * | 5/1999 | Clarke et al. | 324/323 |

FOREIGN PATENT DOCUMENTS

| | | |
|---|---|---|
| EP | 0281946 | 9/1988 |
| RU | 1772775 | 10/1992 |
| WO | 9307514 | 4/1993 |
| WO | 9714980 | 4/1997 |

OTHER PUBLICATIONS

International Search Report, PCT/GB 98 02234, Dec. 15, 1998, 3 pp.

* cited by examiner

Primary Examiner—Walter E. Snow
(74) Attorney, Agent, or Firm—Baker Botts L.L.P.

(57) ABSTRACT

A method and apparatus for determining properties of rocks surrounding a borehole in which electrokinetic signals are generated in the rocks is disclosed. For example, the signals may be generated by the vibration induced by the drilling of the borehole or by a seismic source emitting continuous pressure waves. The electrokinetic signals generated are detected and the signal amplified and processed to measure the porous rock properties.

20 Claims, 2 Drawing Sheets

ENHANCED DETECTION METHOD

CROSS-REFERENCE TO RELATED APPLICATIONS

This is a continuation of copending application No. PCT/GB98/00234, filed Jul. 27, 1998 which is incorporated by reference herein and which published in English on Feb. 4, 1999, which in turn claims priority from GB 9715912.3, filed Jul. 28, 1997.

The present invention relates to a method and equipment for measuring the properties of subsurface rock from a module close to the drilling bit operating during drilling. In particular it relates to a method and equipment for measuring such properties as the response time and amplitude of the electrokinetic response and deducing the pore fluid electrical conductivity, porosity and permeability of fluid-bearing porous rocks.

BACKGROUND OF THE INVENTION

The measurement of permeability of rocks surrounding a borehole is important in assessing the location of water or oil reserves, including the quality and quantity of the reservoir rock. Existing methods are unable to measure the permeability of a porous rock directly with any accuracy from a downhole tool. It is valuable to measure the properties of a formation during drilling usually called logging while drilling (LWD) in order to vary the drilling as a response (called geosteering).

In addition to its value in the assessment of the quality and distribution of porous rock containing water or oil in reservoirs, the rock permeability is very important in determining at what rate and at what cost these fluids can be produced from production wells.

U.S. Pat. No. 3,599,085 describes a method in which a sonic source is lowered down a borehole and used to emit low frequency sound waves. Electrokinetic effects in the surrounding fluid-bearing rock cause an oscillating electric field in this and is measured at at least two locations close to the source by contact pads touching the borehole wall. The electromagnetic skin depth is calculated from the ratio of electrical potentials and the permeability of the rock deduced. U.S. Pat. No. 4,427,944 and the equivalent European Patent 0043768 describe a method which injects fluid at high pressure from a downhole tool to generate electrokinetic potentials; these are measured by contact electrodes against the borehole wall. The risetime of the electrical response is measured and from this the permeability of the porous rock is determined.

UK Patent 2,226,886A and the equivalent U.S. Pat. No. 4,904,942 describe several arrangements for recording electrokinetic signals from subsurface rocks mainly with the electrodes for measuring the signals at or close to the earth's surface but including use of an acoustic source mounted on a downhole tool. There is no indication of permeability being deduced or of inferring porosity. A further related (inverse) method is described in European Patent 0512756A1, which contains several arrangements for setting out electrical sources and acoustic receivers (geophones) in order to measure electro-osmotic signals induced in subsurface rocks.

PCT Patent WO 94/28441 describes a method whereby sound waves of fixed frequency are emitted from a downhole source and the resulting electrokinetic potentials measured. An electrical source of fixed frequency is then used to produce electro-osmotic signals and the acoustic response measured. Using both responses together, the permeability is then deduced, provided the electrical conductivity of the rock is also separately measured.

In these methods the seismic shock is generated downhole at intervals and require a separate means for generating the signals downhole.

SUMMARY OF THE INVENTION

We have now devised an improved method for measuring the properties of porous rocks.

According to the invention there is provided a method for determining properties of rocks surrounding a borehole in which method electrokinetic signals generated in the rocks by the vibration induced by the drilling of the bore hole or by a seismic source emitting continuous pressure waves are detected by a detection means down the borehole and the signals processed to measure the porous rock properties.

Properties which can be measured by the method of the present invention include permeability, porosity and fluid properties such as viscosity, electrical conductivity and zeta potential.

The vibration signal produced by the drilling or by a seismic source is propagated outwards in all directions through the borehole fluid (the fluid in the borehole e.g. drilling mud etc.) and, subject to distortion by the borehole wall and variations in the rock, the signal propagates outwards substantially uniformly in all directions. The electrical signal generated within the surrounding rock is received and detected at the tool within the borehole from substantially all directions.

This invention also provides apparatus for measuring the properties of rocks surrounding a borehole, which apparatus comprises a module adapted to be lowered down a borehole in which module there is a means adapted to detect electrical signals generated in the rocks either by the seismic effect of the drilling of the borehole or by seismic signal emitted from the module.

The electrical signals can be detected by means of a pair of electrodes positioned within the borehole close to the borehole wall or, preferably, an electrode pair or short dipole antenna mounted downhole and positioned centrally and aligned axially within the borehole. In the equipment of the present invention it is convenient to use one or two electrical receivers spaced apart and preferably aligned vertically or horizontally at the centre of the borehole.

The electrical receiver preferably consists of one or two pairs of electrodes forming a short dipole antenna with electrically isolated ends. For each pair the electrodes are preferably connected to an amplifier which amplifies the signals whilst keeping them electrically isolated; this is carried out by referring the potential of each electrode independently to a floating reference potential. The signals are preferably amplified and converted to digital form before being communicated (e.g. by acoustic means) to the surface for recording and processing.

Preferably the means for detecting the electrical signals compares the potential at the ends of dipole antenna are compared by connecting them to an amplifier in which the potentials are preferably referred to a non-earthed reference (a virtual earth) and these new potentials are amplified and compared. Such a procedure allows amplification with very little distortion of the potential to be measured and with a high degree of common-mode noise rejection and is superior to other conventional methods of amplification.

Preferably the non-earthed reference potential is that of a common line in the amplification and data acquisition circuitry of the receiver and is not connected directly to earth.

DETAILED DESCRIPTION OF THE PREFERRED EMBODIMENTS

The drilling of boreholes using conventional dolling means and drilling bits can generate vibrational and other shocks to the surrounding rocks in a range of frequencies depending on the speed of the drill, nature of the rock, downward pressure etc.

The drilling can be carried out by any drilling means which generates suitable vibrations in the rocks, conventional drill bits drilling through rock generate vibrations in a wide range of frequencies and these vibrations surprisingly have been found to act to generate electrical effects in the surrounding rocks. The seismic waves generated by the drill bit can be measured by a transducer on the module which converts pressure variation to electrical signals so that they can be used for demodulation or recording.

Preferably the amplified electrical signals from the receiver are deconvolved with respect to the source frequencies and the amplitude and phase relative to the source sampled at a frequency of about 1–100 Hz per channel and converted from analogue to digital form. The digital data transmitted to surface is recorded as a data file and can then be processed.

Alternatively a source of seismic or acoustic signals can emit these from the module in order to achieve a more controlled source than the effect from drilling.

The amplitude and rate of response of electrokinetic signals to acoustic pulses have been shown to be closely related to the porosity and the permeability of the target porous rock. After processing of the amplitude of response at more than one frequency a log of rock permeability and porosity and also pore fluid conductivity can be produced which may also include fluid viscosity and rock zeta potential. Alternatively, if the amplitude and phase of the electrokinetic response at a single frequency are measured are measured, the permeability and porosity may be derived from these.

It is believed that the method of the present invention makes use of an electrokinetic effect in which the seismic wave generated by the drilling on passing through the interface of the borehole with the surrounding porous rock and through interfaces within the rock where the fluid properties change, stimulates electrical signals detected at the receiving electrodes or coils. The oscillations within the porous rock give rise to fluid flow within the rock and as cations and anions adhere with differing strengths to capillary walls, a resulting electric dipole is generated within the rock. This electric dipole distorts the quasi-static electric field within the slightly conducting medium of the rock and this distortion propagates back to the tool, where it is measured. The invention will now be described with reference to the accompanying drawings in which.

Figure 1:
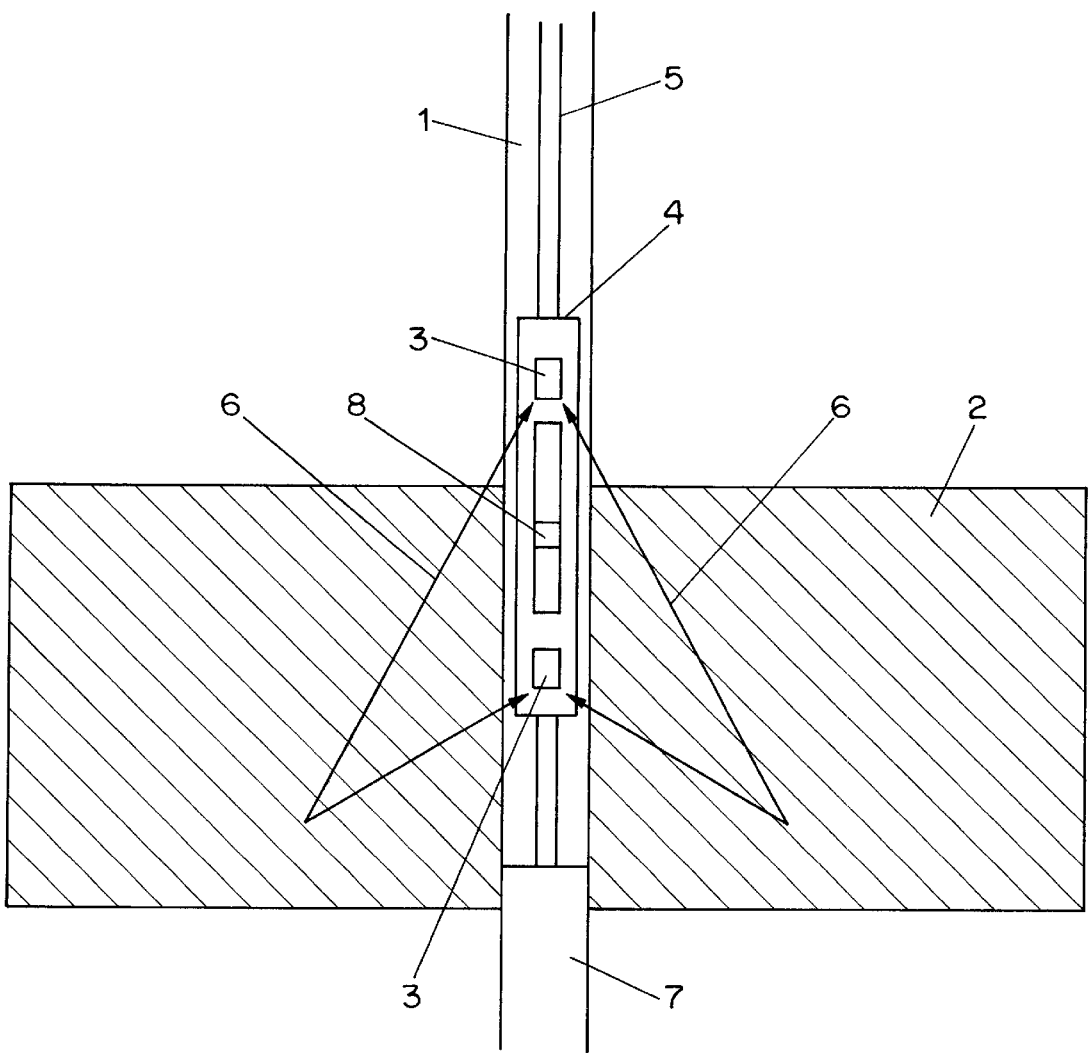
FIG. 1 is a sectional view of an apparatus for measuring the properties of rocks surrounding a borehole in accordance with the invention.

FIG. 1 is a schematic view of the invention and

Figure 2:
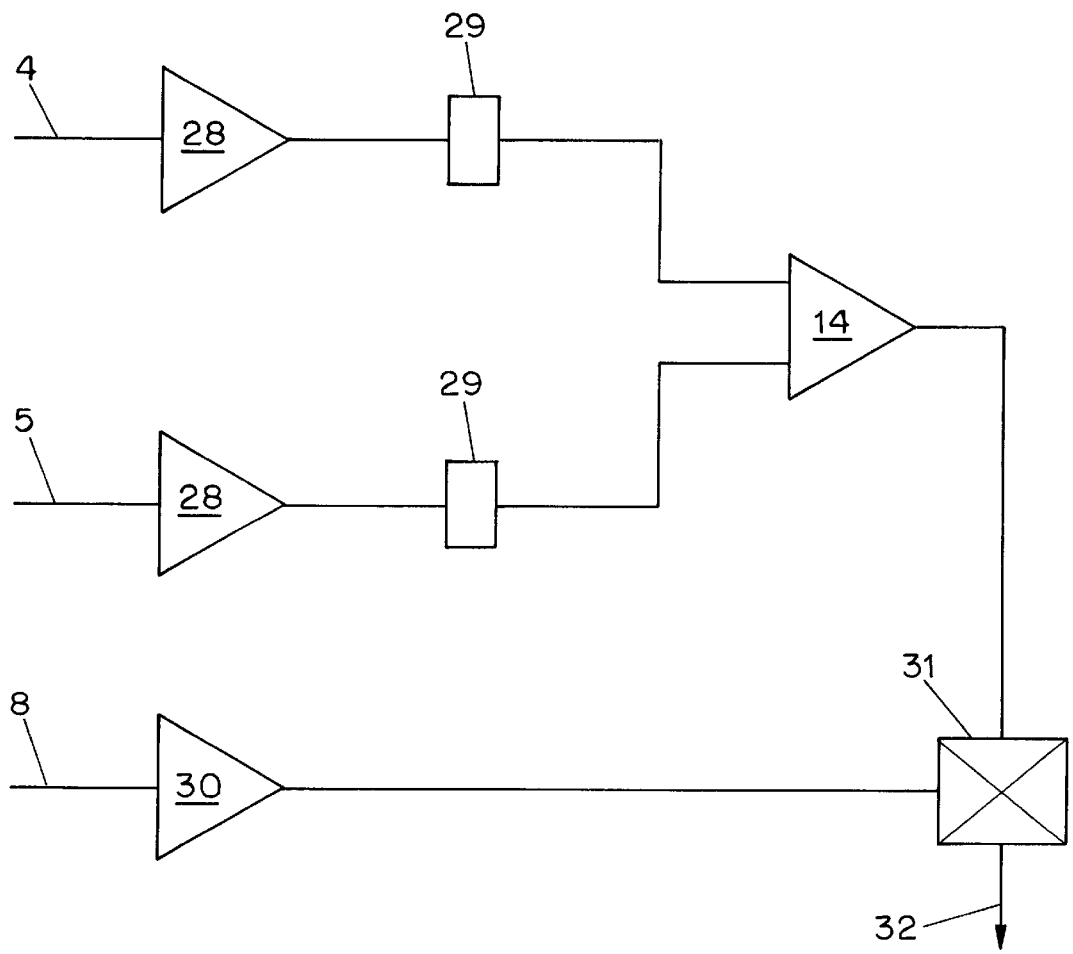
FIG. 2, is a schematic of a circuit diagram illustrating amplifier connections in accordance with the invention.

FIG. 2 is a circuit diagram showing amplifier connections

Referring to FIG. 1 the downhole receiver module (4) is connected to the drill string (5) so that it can be raised and lowered down borehole (1). In the receiver module is an antenna comprising one pair of electrodes (3). In use, the vibrations and oscillations generated by the drilling using drilling bit (7) produce a seismic signal measured by a transducer (8) comprising continuous acoustic oscillations and this generates an electrokinetic signal (6) in the surrounding rock (2) which is detected by electrodes (3) and the amplitude and response time of this electrokinetic signal generated measured.

Referring to FIG. 2, the signal from the electrodes (4,5) pass to a pair of low-noise operational amplifiers (28) which provide keep the two channels isolated from each other. Preset balancing controls (29) control the balancing of common mode noise in each line before they are compared and amplified by a final stage amplifier (14). Signals from the transducer (8) pass through an amplifier (30) and are used at (31) to demultiplex the main signals, giving a response signal which is sent to surface (32).

What is claimed is:

1. A method for determining properties of rocks surrounding a borehole comprising:

generating an electrokinetic effect in the rocks by vibration signals induced by at least one source selected from the group consisting of drilling the borehole and emitting continuous pressure waves from a seismic source attached to a module which emits seismic signals;

converting pressure variations generated by the at least one source to electrical signals with at least one transducer located in the borehole detecting the electrokinetic effect by a detection means located in the borehole which generates a second electrical signal, and comparing the second electrical signal and the electrical signals to determine porous rock properties.

2. A method according to claim 1 wherein the borehole comprises fluid and wherein the vibration produced propagates outwards substantially uniformly in all directions.

3. A method according to claim 1 wherein the detection means comprises at least one selected from the group consisting of coils and a pair of electrodes positioned within the borehole.

4. A method according to claim 1 wherein the detection means comprises an electrode pair of short dipole antenna mounted downhole and positioned centrally and aligned axially within the borehole.

5. A method according to claim 4 wherein the detection means compares a potential across the ends of the dipole antenna.

6. A method according to claim 3 wherein each electrode in the electrode pair is connected separately to an amplifier which amplifies the signals while keeping the electrodes electrically isolated.

7. A method according to claim 4 wherein each electrode in the electrode pair is connected separately to an amplifier which amplifies the signals while keeping the signals electrically isolated.

8. A method according to claim 7 comprising comparing the potential across the ends of dipole antenna by connecting the ends to an amplifier wherein the potentials are referred to a non-earthed reference potential thereby generating a revised potential, and further comprising amplifying and comparing the revised potentials.

9. A method according to claim 8 further comprising providing a receiver comprising amplification and data acquisition circuitry and having a common line which provides the non-earthed reference potential and wherein the amplifier has an earth which is isolated from the data acquisition circuitry.

10. A method according to claim 9 further comprising providing a receiver comprising the amplification and data acquisition circuitry and having a common line which provides the non-earthed potential wherein the non-earthed reference potential is not connected directly to the earth.

11. A method according to claim 3 comprising providing an amplifier circuit for receiving signals from the at least one selected from the group of electrodes and coils and isolating and balancing signals from each of the electrodes before signals from the electrodes are received by the amplifier circuit.

12. A method according to claim 8 comprising providing an amplifier circuit for receiving signals from the electrodes and isolating and balancing signals from each of the electrodes before signals from the electrodes are received by the amplifier circuit.

13. A method according to claim 1 comprising converting the electrokinetic signals to digital signals before processing.

14. A method for determining properties of rocks surrounding a borehole comprising:
   generating an electrokinetic effect in the rocks by vibration signals induced by at least one source selected from the group consisting of drilling the borehole and emitting continuous pressure waves from a seismic source attached to a module which emits seismic signals;
   converting pressure variations generated by the at least one source to electrical signals with at least one transducer located in the borehole;
   detecting the electrokinetic effect by a detection means located in the borehole which generates a second electrical signal; and
   comparing the second electrical signal and the electrical signals to determine porous rock properties, the method further comprising amplifying the second electrical signal in a receiver, deconvoluting the second electrical signals with respect to the electrical signals, sampling amplitude and phase of the second electrical signal relative to the electrical signals at a frequency of about 1 to 100 Hz and converting the deconvoluted second electrical signal to a digital signal.

15. Apparatus for measuring the properties of rocks surrounding a borehole comprising at least one seismic signal generator selected from the group consisting of a drill and a seismic source attached to a module,
   at least one pressure measurement device which converts pressure variations to electrical signals,
   a means which detects an electrokinetic effect induced by the at least one seismic signal generator and generates a second electrical signal, and
   a comparator which compares the second electrical signal and electrical signals.

16. Apparatus according to claim 15 wherein the means for detecting the electrokinetic effect includes at least one selected from the group consisting of a pair of electrodes and coils positioned within the borehole.

17. Apparatus according to claim 15 wherein the means for detecting the electrokinetic effect comprises an electrode pair of short dipole antenna mounted downhole and positioned centrally and aligned axially within the borehole.

18. Apparatus according to claim 15 wherein the ends of the dipole antenna are connected to an amplifier which amplifies the second electrical signal and compares the second electrical signal to a non-earthed reference.

19. Apparatus according to claim 18 including means for isolating and balancing the signals from each of the electrodes before receipt of the signals by the amplifier.

20. Apparatus according to claim 16 wherein each electrode in the electrode pair is connected separately to an amplifier wherein the amplifier amplifies the signals while keeping the electrodes electrically isolated.

* * * * *

UNITED STATES PATENT AND TRADEMARK OFFICE
CERTIFICATE OF CORRECTION

PATENT NO. : 6,452,395 B1  
DATED : September 17, 2002  
INVENTOR(S) : Clarke et al.

It is certified that error appears in the above-identified patent and that said Letters Patent is hereby corrected as shown below:

Column 2,  
Lines 56-57, "are compared" should be deleted

Column 3,  
Line 17, "rocks, conven-" should read -- rocks. Conven- --  
Lines 43-44, "are measured" should be deleted  
Lines 59-62, "The invention will now be described with reference to the accompanying drawings in which.  
FIG. 1 is a schematic view of the invention and  
FIG. 2 is a circuit diagram showing amplifier connections" should be deleted Column 4,  
Line 9, "provide" should be deleted  
Line 27, "borehole" should read -- borehole; --  
Line 30, "signal, and" should read -- signal; and --  
Line 35, "comprises" should read -- contains --  
Line 42, "of" should read -- or --

Column 6,  
Line 1, "signals" (first occurrence) should read -- signal --  
Line 23, "of" should read -- or --

Signed and Sealed this

Fourth Day of February, 2003

JAMES E. ROGAN  
*Director of the United States Patent and Trademark Office*